US010679244B1

United States Patent
Bhowmick et al.

(10) Patent No.: US 10,679,244 B1
(45) Date of Patent: Jun. 9, 2020

(54) PUBLISHER IDENTITY VERIFICATION THROUGH CROSS-DOMAIN BARRIER

(71) Applicant: Amazon Technologies, Inc., Reno, NV (US)

(72) Inventors: Diptendu Bhowmick, West Bengal (IN); Ashwin Devendrappa Tengli, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 1057 days.

(21) Appl. No.: 15/061,867

(22) Filed: Mar. 4, 2016

(51) Int. Cl.
G06Q 30/02 (2012.01)

(52) U.S. Cl.
CPC ..... *G06Q 30/0248* (2013.01); *G06Q 30/0277* (2013.01)

(58) Field of Classification Search
None
See application file for complete search history.

(56) References Cited

U.S. PATENT DOCUMENTS

| | | | | |
|---|---|---|---|---|
| 7,398,311 | B2* | 7/2008 | Joshi | G06F 21/62 709/225 |
| 7,640,347 | B1* | 12/2009 | Sloat | H04L 67/2842 709/203 |
| 10,037,552 | B1 | 7/2018 | Lorimor et al. | |
| 2002/0874030 | | 7/2002 | Meyers | |
| 2002/0107892 | A1 | 8/2002 | Chittu | |
| 2004/0030784 | A1* | 2/2004 | Abdulhayoglu | G06F 21/10 709/227 |
| 2007/0129999 | A1* | 6/2007 | Zhou | G06Q 30/0248 705/14.47 |
| 2009/0193458 | A1 | 7/2009 | Finseth | |
| 2011/0029393 | A1 | 2/2011 | Apprendi et al. | |
| 2011/0320529 | A1 | 12/2011 | Mentchoukov et al. | |
| 2012/0101907 | A1* | 4/2012 | Dodda | G06Q 30/0277 705/14.73 |
| 2012/0173315 | A1 | 7/2012 | Martini | |
| 2013/0185164 | A1 | 7/2013 | Pottjegort | |
| 2014/1808290 | | 6/2014 | Umeda | |
| 2014/0281901 | A1 | 9/2014 | Mostowy et al. | |
| 2015/0081406 | A1 | 3/2015 | Matsubara et al. | |
| 2015/0089542 | A1 | 3/2015 | Sumitomo et al. | |
| 2015/0169521 | A1 | 6/2015 | Leventhal et al. | |
| 2017/0053307 | A1* | 2/2017 | Schler | G06Q 30/0248 |

OTHER PUBLICATIONS

Non-Final Office Action issued in co-related U.S. Appl. No. 14/815,056 dated Oct. 3, 2018.

(Continued)

*Primary Examiner* — Alexandru Cirnu
(74) *Attorney, Agent, or Firm* — Hogan Lovells US LLP

(57) ABSTRACT

Various approaches allow for determining fraudulent activity as it relates to a publisher's reported web address and/or whether content has been viewed, or at least displayed with the opportunity of being viewed. When a user visits a web page, or other such page or application that displays content, the web page can be rendered with advertisements and/or other content. Approaches described herein can verify a publisher's reported web address as well as attempt to determine whether a user is given an opportunity to view such content by determining and utilizing a snapshot of the content.

19 Claims, 7 Drawing Sheets

(56) References Cited

OTHER PUBLICATIONS

Final Office Action issued in co-related U.S. Appl. No. 15/061,803 dated Oct. 30, 2019.
Non-Final Office Action issued in co-related U.S. Appl. No. 14/815,056 dated Oct. 24, 2019.
Non-Final Office Action issued in co-related U.S. Appl. No. 15/061,824 dated Sep. 13, 2019.
Non-Final Office Action issued in co-related U.S. Appl. No. 15/061,803 dated Jul. 8, 2019.
Final Office Action issued in co-related U.S. Appl. No. 14/815,056 dated May 31, 2019.
Lee, K. (2014) Visual-based Web Page Analysis (Order No. 155516), Available from ProQuest Dissertations and Theses Professional (1532775043) Retrieved from https://dialog.proquest.com/ (Year 2014).
IAB releases SafeFrame 1.0 for public comments, specifications will power 'viewable impression' measurement standards (Nov. 19, 2012). Targeted News Service Retrieved from https://dialog.proquest.com (Year 2012).

\* cited by examiner

US 10,679,244 B1

PUBLISHER IDENTITY VERIFICATION THROUGH CROSS-DOMAIN BARRIER

BACKGROUND

Traditionally, advertisers have used a variety of different media to deliver their messages, including magazines, newspapers, billboards, television, radio, etc. More recently, advertisers have started to utilize interactive electronic media. For example, advertisements may be placed alongside web pages being displayed on a web browser, alongside recorded television programming that is being displayed by a digital video recorder, alongside content that is being displayed on a mobile device, etc. When an advertisement is served on a web page, usually it is placed inside a cross-domain iFrame, advertisement viewing area, or other such content viewing area to prevent an advertiser or other entity from pulling any confidential information from the web page. The iFrame creates a barrier between a publisher of the web page and the advertiser because of browser-imposed cross-domain security restrictions. A fraudulent publisher or other such entity can exploit this restriction to forge an identity and get advertisements served on a web page with low quality content or content an advertiser does not want to be associated. Further, in many of the advertising techniques used, an advertisement has value to an advertiser when that advertisement is viewed, or at least displayed with the opportunity of being viewed. However, whether a user has viewed or had an opportunity to view an advertisement can be difficult to measure. A number of conventional approaches attempt to measure viewability (i.e., whether a viewer has had an opportunity to view an advertisement). However, oftentimes, these approaches are responsible for large discrepancies in viewability, which can be frustrating to advertisers looking to ensure that viewability rates are for advertisements that were actually "in view" and don't include advertisements that were not measurable. Further, while consistent reporting across multiple advertising campaigns is essential, other insights beyond viewability, such as fraud detection, content quality and pre-bid viewability in real-time bidding (RTB) ad exchanges are important.

BRIEF DESCRIPTION OF THE DRAWINGS

Various embodiments in accordance with the present disclosure will be described with reference to the drawings, in which.

DETAILED DESCRIPTION

Figure 1:
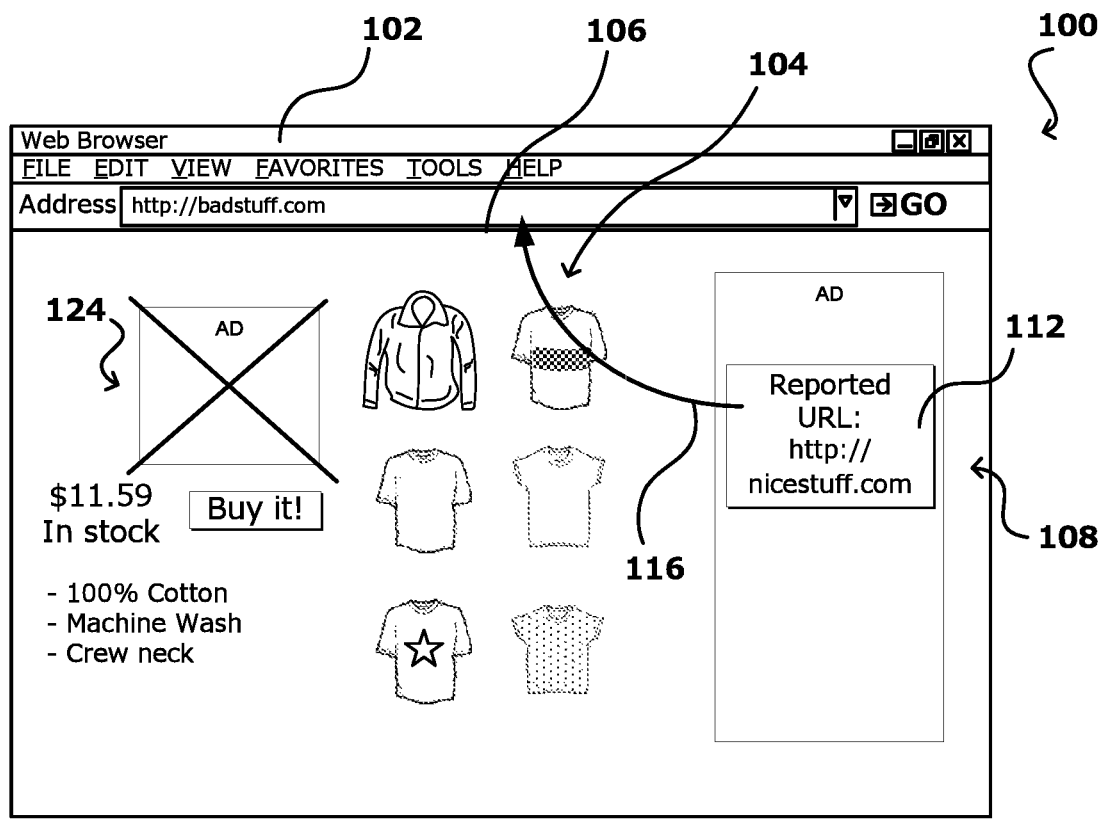
FIG. 1 illustrates an example environment in which aspects of the various embodiments can be utilized.

Systems and methods in accordance with various embodiments of the present disclosure overcome one or more of the above-referenced and other deficiencies in conventional approaches to determining fraudulent activity as it relates to a publisher's reported web address and whether content has been viewed, or at least displayed with the opportunity of being viewed. In accordance with various embodiments, when a user visits a web page, or other such page or application that displays content, the web page can be rendered with advertisements and/or other content. Approaches described herein can verify a publisher's reported web address as well as attempt to determine whether a user is given an opportunity to view such content by determining and utilizing a snapshot of the content.

In accordance with various embodiments, a component operating on a computing device, a script executing on web browser, or other software code or application, can be used to verify a publisher's reported web address of content. For example, an advertisement viewing area of a web page can be identified. The advertisement viewing area can be used to display an advertisement on the web page of a web browser, where the web browser can include an address bar area indicating a uniform resource locator (URL) of the web page. The URL in the address bar can be updated to a publisher reported URL associated with the web page. A reload request of the web page can be detected and the publisher reported URL can be compared to an actual URL associated with a publisher of the web page. It can be determined there is a mismatch between the publisher reported URL and the actual URL associated with the publisher of the web page. In the situation where it is determined that the publisher reported URL does not match the actual URL associated with the publisher of the web page, then the publisher reported URL can be flagged as potentially fraudulent and a request can be submitted to a logging service indicating that the publisher reported URL is potentially fraudulent. In the situation where it is determined that the publisher reported URL matches the actual URL associated with the publisher of the web page, then it can be determined that the publisher reported URL is not fraudulent, and a request can be submitted to a logging service indicating that the publisher reported URL is fraudulent. A number of instances of the mismatch can be determined and compared to a threshold. In the situation where the number of instances meets a threshold, the publisher's reported web address can be considered fraudulent.

In certain embodiments, it may be desirable to determine whether the publisher is attempting to fraudulently display content on a web page. This can include, for example, determining whether a user was given an opportunity to view such content on a web page. Such an approach can include utilizing a snapshot of the content to determine whether content has been "viewed." For example, in accordance with various embodiments information used to render a potential advertisement in the advertisement viewing area can be determined. The information can be compared to stored information to determine a similarity score between the potential advertisement and a verified image of the advertisement. The similarity score can be compared to a threshold similarity score to determine whether the potential advertisement is potentially fraudulent. In the situation where it is determined that the similarity score does not meet a threshold similarity score, it can be determined that the potential advertisement is potentially fraudulent and a request to a logging service indicating that the potential advertisement is potentially fraudulent can be submitted. In the situation where it is determined that the similarity score meets a threshold similarity score, it can be determined that the potential advertisement is not fraudulent and a request to a logging service indicating that the potential advertisement is not fraudulent can be submitted.

Various other functions and advantages are described and suggested below as may be provided in accordance with the various embodiments.

FIG. 1 illustrates an example environment 100 in which aspects of the various embodiments can be utilized. The example environment 100 illustrates a web browser or other web viewer 102 that is configured to electronically access content (e.g., a website or web page) from a content publisher ("publisher"). The publisher can participate in online publishing, which is the process of using computer and specific types of software to combine text and graphics to produce Web-based documents such as newsletters, online magazines and databases, brochures and other promotional materials, books, and the like, with the Internet as a medium for publication. Publishers can display such content on a web page. In this way, publishers can create opportunities for displaying electronic advertisements ("ads") with their content. Publishers can provide such opportunities independently or be represented by an advertisement network ("ad network"). For example, when a user accesses a web page of a publisher, the server hosting the web page can send an advertisement request to an advertisement exchange ("ad exchange"). This request may include information describing the web page, publisher, and/or the user. Once the request is received by the ad exchange, advertisers can bid to fill that request with their advertisement and an advertisement can be provided and displayed on the web page. When an advertisement is served on the publisher web page, usually it is placed inside a cross-domain iFrame, advertisement viewing area, or other such content viewing area to prevent an advertiser or other entity from pulling any confidential information from the publisher web page. The iFrame creates a barrier between the publisher and the advertiser because of browser-imposed cross-domain security restrictions. A fraudulent publisher or ad exchange can exploit this restriction to forge an identity and get advertisements served on a web page with low quality content or content an advertiser does not want to be associated with. For example, a publisher of a web page with obscene or pirated content might get very high traffic but monetization of the web site could be very low because many advertisers might not want to serve advertisements on such web pages to protect their brand values. Even if some advertiser agrees to serve advertisements, they might offer much lower prices compared to a premium quality site. Under such circumstances, if the publisher could fake the identity of the web page by providing an incorrect web page URL then they could monetize the ad slots better.

As shown in example 100 of FIG. 1, web browser 102 is displaying products 104 on web page 106, a product listing 124 that includes an image of an obscene product, a price listing of the obscene product, a description of the obscene product, and a selectable element to purchase the obscene product, and an advertisement viewing area ("ad slot") 108 or other content viewing area. An advertisement viewing area ("ad slot") can be the area on a web page or other display area where an advertisement loads. As described, a publisher of a web page with obscene content might get very high traffic but monetization of the web site could be very low because many advertisers might not want to serve advertisements on such web pages to protect their brand values. Accordingly, publisher identity verification is an essential process in ad serving lifecycle because it enables such entities to determine publisher quality and other brand safety features. Conventionally, ad exchanges and advertisers depend on the web page URL shared by the publisher to identify the inventory location. However, this approach is susceptible to fraud because a fraudulent publisher, an intermediate ad network, or other entity can easily tamper with the URL. For example, as shown in FIG. 1, the publisher reported URL 112 "http:nicestuff.com" does not match 116 the actual publisher URL 114 "http://badstuff-.com." It should be noted that an advertiser or ad exchange cannot read the browser address bar URL because oftentimes an exchange iFrame can be enclosed by a cross-domain iFrame and browser security policy does not allow reading any information from parent frame unless they belong to the same domain. Accordingly, in accordance with various embodiments, approaches enable advertisers, ad exchanges, or other such entities to circumvent this restriction to verify the identity of a publisher in real time by verifying the URL of the publisher web page. Using this approach, these entities can compare the publisher reported URL with the actual web page URL when the advertisement is served and flag the publisher if there is a mismatch.

Figure 2:
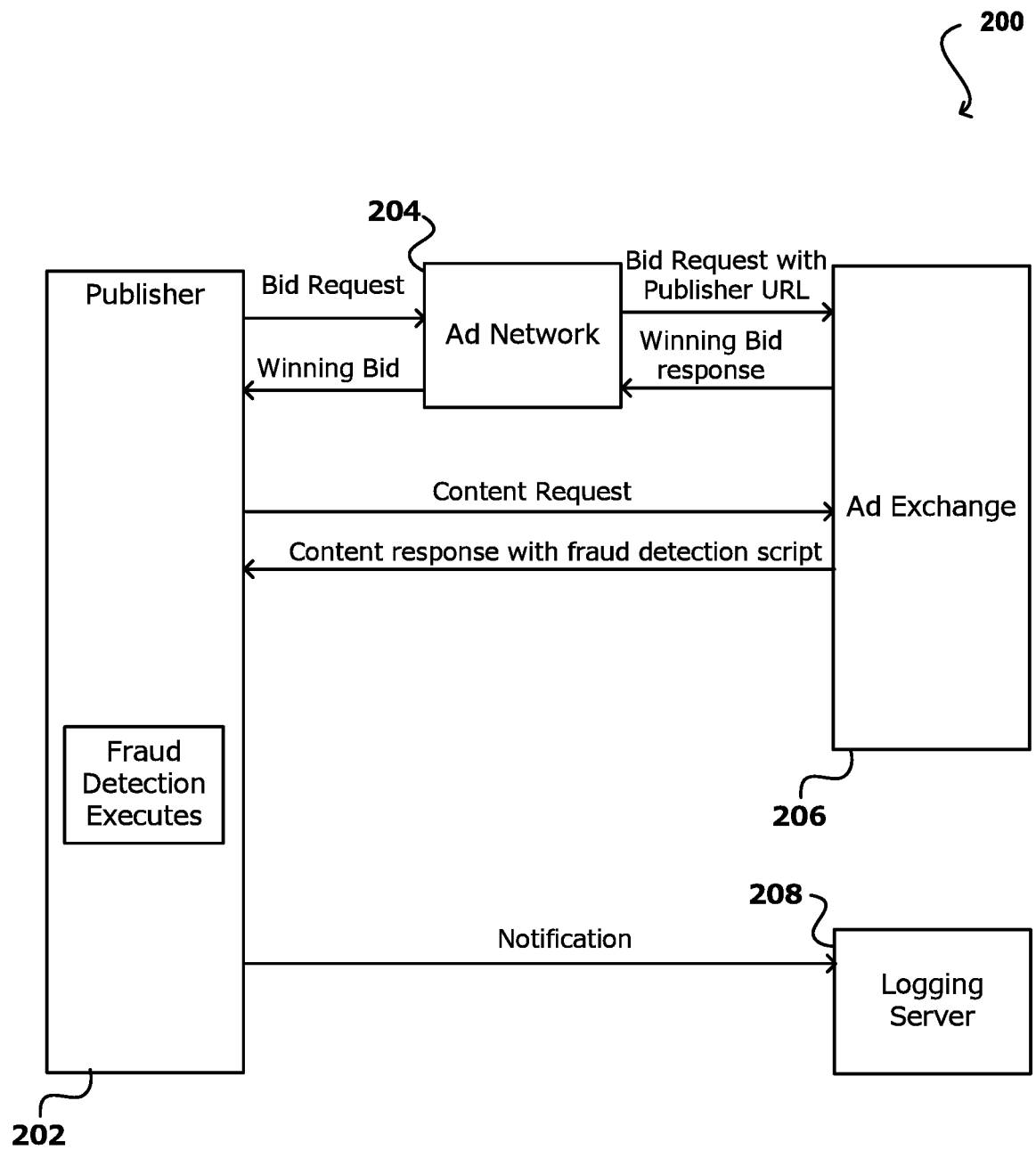
FIG. 2 illustrates an example process for determining a fraudulent publisher of content in accordance with various embodiments.

FIG. 2 illustrates an example process 200 for determining a publisher's identity in accordance with various embodiments. As shown, FIG. 2 includes a publisher 202, ad network 204, ad exchange 206, and logging server 208. As described, in real-time bidding (RTB), publisher 202 can integrate with ad network 204 or ad exchange 206 to monetize one or one ad slots (e.g., content viewing area, advertisement viewing area, etc.) on a web page provided by the publisher. For example, publisher 202 provides a bid request through one or more ad networks 204. The ad exchange 206 checks for traffic quality and brand safety based on the URL included in the bid call. Then the ad exchange 206 responds back with the advertisement URL and the winning bid call. After several such bids on multiple ad exchanges if the ad provider's bid happens to be the final winner, then an advertisement call may be sent to the ad provider's ad exchange for the ad creative. The ad provider can respond with the ad markup and/or content and fraud detection script. The script gets executed after the advertisement and/or content renders. In response to executing the script, a notification can be reported to the logging server 208 if the URL verification fails (i.e. a mismatch found between the URLs obtained from address bar and bid call). An example notification can be a message, a pixel, a value, etc. The result can be stored in a log file in a database at the logging server 208 or some other entity. Thereafter, a validation system (at the logging server or otherwise in communication with the logging server) can process each log and generate an entry in the log file to invalidate such advertisements. Actions (e.g., clicks, consideration) performed on these advertisements can also invalidated. A machine learning based classifier or other such approach can analyze the logs to categorize publishers as fraudulent or otherwise.

As described, the verification process can determine whether the publisher reported URL matches with the actual web page URL. In this process, the publisher reported URL is entered in the address bar of the web browser. It should be noted that although some browsers do not allow processes to read the value of address bar URL, the value of the address bar URL can be changed. In accordance with various embodiments, a web browser will start reloading the web page if the publisher reported URL is not correct (i.e., the URL does not match the address bar URL.) The reload can be detected and whether the web page reloaded and can be used to determine the publisher authenticity. Thereafter, information indicating whether the web page attempted to load can be provided to the logging server 208. In various embodiments, the web page can be prevented from reloading as to not impact user experience. One approach includes repeatedly redirecting the web page to another location that returns HTTP 204 status. Since HTTP 204 indicates that the destination web page has no content, the web browser does not refresh the web page. Instead the web page detects no operation and flushes the redirection URL cache. Thus the initial web page refresh request triggered gets canceled.

Figure 3:
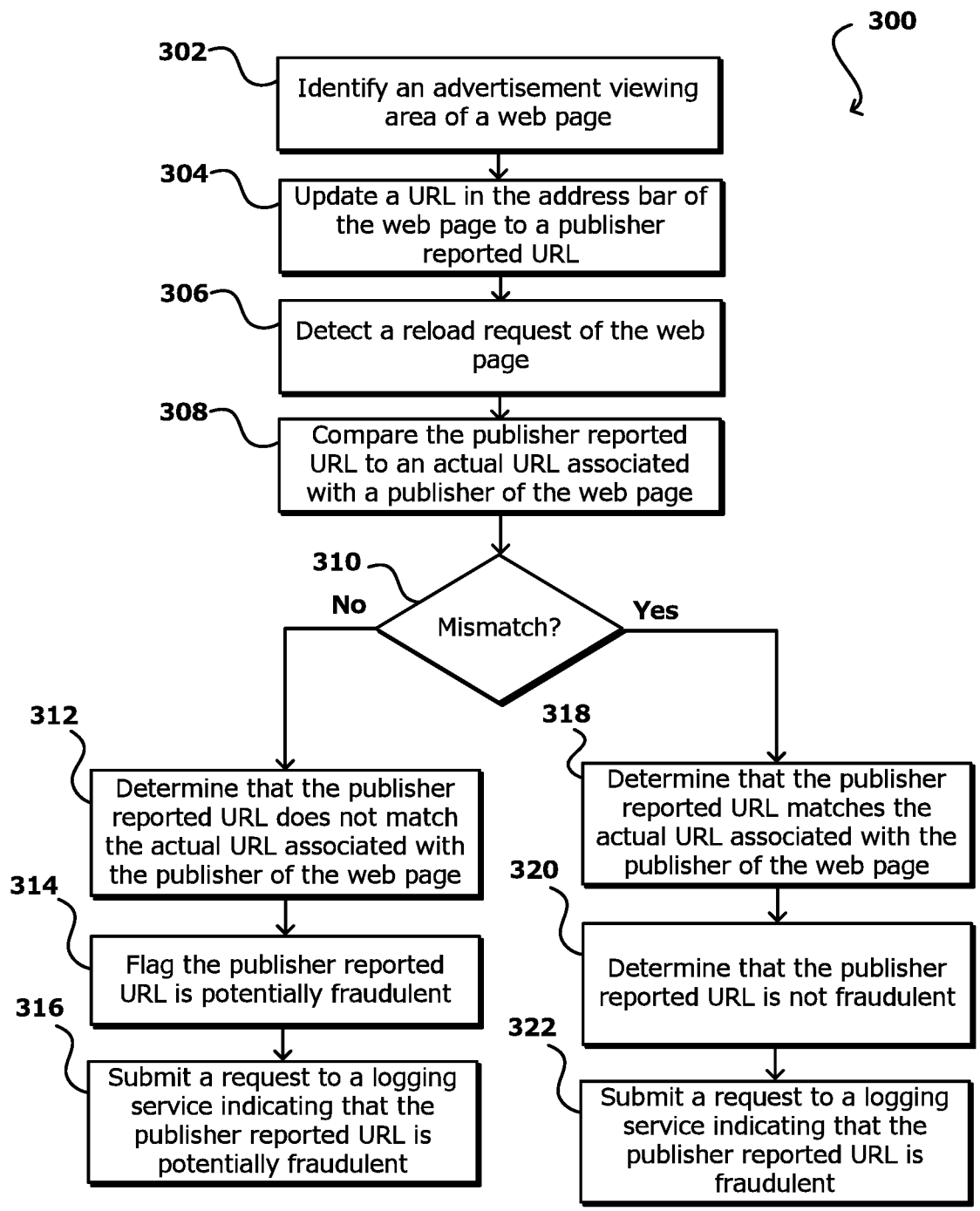
FIG. 3 illustrates an example process for verifying a publisher's web page URL in accordance with an embodiment.

FIG. 3 illustrates an example process 300 for determining viewability of content in accordance with various alternate embodiments. In this example, a component operating on a computing device, a script executing on web browser, or other software code or application, can be used to verify an identify on a publisher of a web page. For example, an advertisement viewing area of a web page can be identified 302. The advertisement viewing area used to display an advertisement on the web page of a web browser, where the web browser can include an address bar area indicating a uniform resource locator (URL) of the web page. The URL in the address bar can be updated 304 to a publisher reported URL associated with the web page. A reload request of the web page can be detected 306. The publisher reported URL can be compared 308 to an actual URL associated with a publisher of the web page and a determination 310 can be made whether there is a mismatch. In the situation where it is determined 312 that the publisher reported URL does not match the actual URL associated with the publisher of the web page, then the publisher reported URL can be flagged 314 as potentially fraudulent and a request can be submitted 316 to a logging service indicating that the publisher reported URL is potentially fraudulent. In the situation where it is determined 318 that the publisher reported URL matches the actual URL associated with the publisher of the web page, then it can be determined 320 that the publisher reported URL is not fraudulent, and a request can be submitted 322 to a logging service indicating that the publisher reported URL is fraudulent. Thereafter, a number of instances of the mismatch can be determined and compared to a threshold of allowable mismatches. In the situation where the number of instances meets a threshold, the publisher's reported web address can be considered fraudulent and an appropriate action can be enabled. In another approach, a machine learning based classifier can analyze the logs to categorize publishers as fraudulent or otherwise. In either situation, such actions can include a review of the publisher, restricting the delivery of advertisements, among other such actions.

As described, approaches described herein attempt to address determining fraudulent activity as it relates to whether content has been severed. In digital advertising, advertising is measured if an advertisement is served, not if the advertisement is on the display screen long enough for a user to see it ("visible"). However, a problem with measuring advertising by whether an advertisement is served is the likelihood of advertisement fraud. Advertisement fraud is the deliberate practice of attempting to serve advertisements that have no potential to be viewed by a human user. An example of advertising fraud can occur when advertisements to be served are served to background tabs or are otherwise served and processed by a background process and the user is not given an opportunity to view the advertisement. Another example of advertising fraud could be a scenario where an advertisement is blocked or obstructed in such a way that the advertisement cannot be viewed by the user, or at least a threshold area of the advertisement cannot be viewed. This can occur when, for example, the advertisement is resized to a small dimension (e.g., 1 pixel by 1 pixel), or content is overlaid on the advertisement. In another example, fraudsters try to inflate viewable advertisement count by rendering invisible advertisements on a web page. For example, when an advertisement gets rendered on a web page there are several ways to make it appear invisible by manipulating the CSS style of the advertisement container. A few examples include changing the opacity of the HTML element and thus making the advertisement fully transparent or applying some three-dimensional transformation on the node so that it becomes perpendicular to the display screen of the computing device. Such a situation is not desirable to advertisers where under conventional standards credit is given for serving the advertisement, and in this example, credit may be given even though the user may never see the advertisement. Accordingly, in accordance with various embodiment, approaches described herein attempt to detect approaches to inflating viewable advertisement count.

Figure 4:
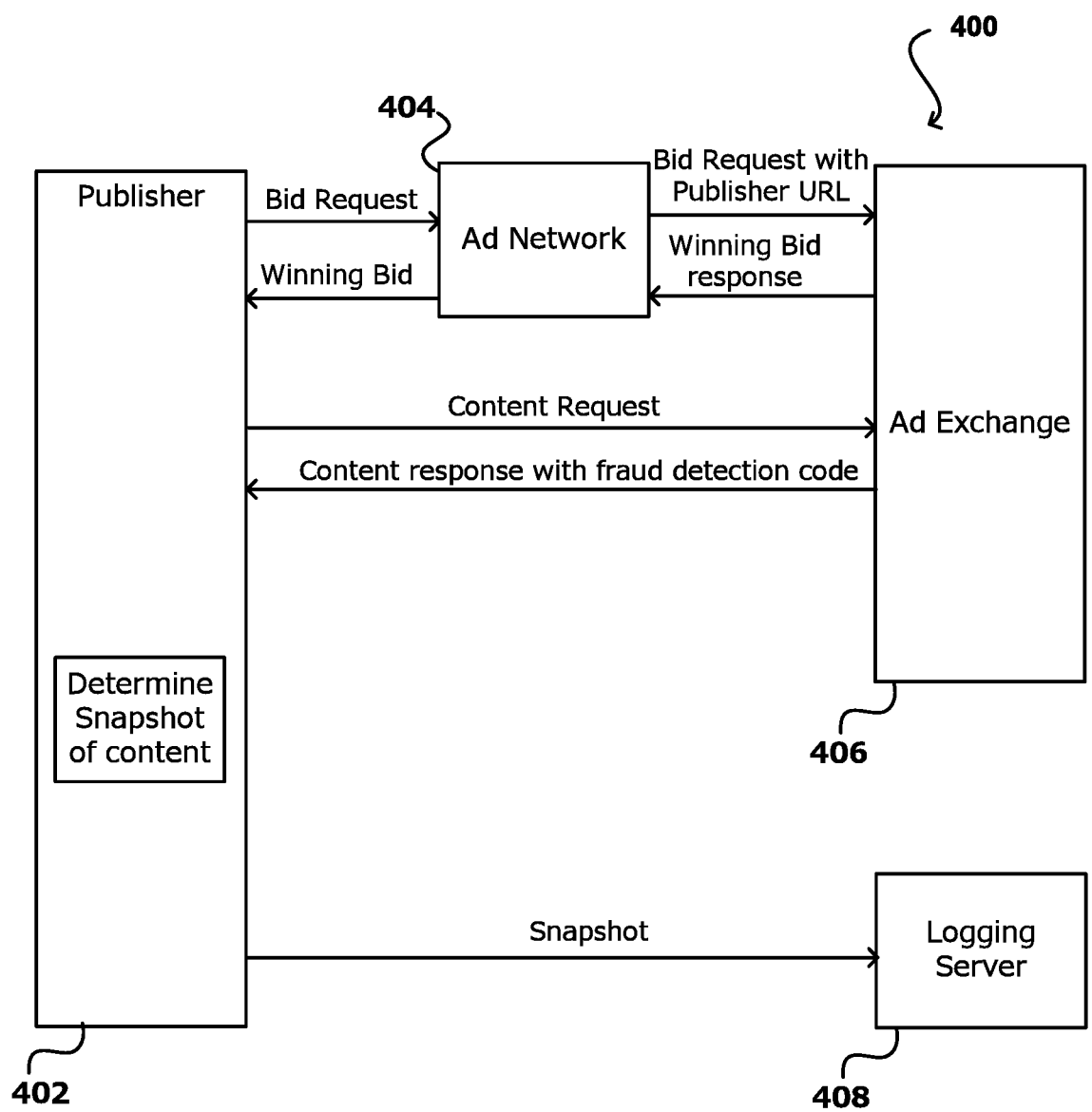
FIG. 4 illustrates an example process for determining viewability of content in accordance with an embodiment.

FIG. 4 illustrates an example process 400 for determining viewability of content in accordance with various embodiments. As shown, FIG. 4 includes a publisher 402, ad network 404, ad exchange 406, and logging server 408. In accordance with various embodiments, in real-time bidding (RTB), publisher 402 can integrate with an ad network 404 or ad exchange 406 to monetize one or more ad slots (e.g., a content viewing area, advertisement viewing area, etc.) on a web page of a publisher's page. An online advertising network can be a company that connects advertisers to web sites that want to host advertisements. The key function of an ad network is aggregation of ad space supply from publishers and matching it with advertiser demand. An ad exchange can be a digital marketplace that facilitates the buying and selling of media advertising inventory from multiple ad networks. Prices for the inventory are determined through bidding. In accordance with various embodiments, content publishers (e.g., publisher 402) can create opportunities for displaying electronic advertisements ("ads") with their content (e.g., web pages). Publishers can provide such opportunities independently or be represented by an advertisement network (e.g., content network 404). For example, when a user accesses a web page of a publisher, the server hosting the web page can send an advertisement request or other content request to a an advertisement exchange (e.g., auction server 406) or other such entity. This request may include information describing the web page, publisher, and/or the user such as the URL of the publisher's web page. Once the request is received by the auction server, advertisers can bid to fill that request with their advertisement and an advertisement or and/or content can be provided and displayed on the web browser.

In one such approach, a publisher provides a bid request through one or multiple ad networks. The ad exchange checks for traffic quality and brand safety based on the URL included in the bid call. Then the ad exchange responds back with the advertisement URL and the winning bid call. After several such bids on multiple ad exchanges if the ad provider's bid happens to be the final winner, then an advertisement call may be sent to the ad provider's ad exchange for the ad creative. The ad provider can respond with the ad markup and fraud detection script. After the advertisement has rendered completely, the fraud detection script executes and generates a snapshot of the advertisement. This can include, for example, first traversing through DOM elements inside the advertisement container to determine information on applied CSS styles on these nodes. The CSS styles for a DOM node can be determined based on the CSS rules inherited from parent nodes and the rules that have been directly applied to the node. Second, a position of each DOM node can be determined. Based on the position of each node, a layout tree can be generated. In this example, each DOM node in the layout tree is represented as a rectangle on a display screen and the size and position for each rectangle is determined based on the CSS style values determined in step two. Third, different layers of the layout tree are determined based on z-index information and transformation style for that node. Finally, each element from the layout tree is converted to a bitmap image based on the size, position and other CSS properties of the node. In this way, the bitmap image is generated using the CSS information that is available within the markup at runtime.

The snapshot is provided to an appropriate service such as logging server 408 for verification. The snapshot can be compared to stored information to determine a similarity between the snapshot image and the actual advertisement. Similarity can be based on a number of factors, as may include size, opacity, obstruction, change of color, change or orientation, among other factors. The advertisement is marked as fraudulent if the similarity value does not satisfy a similarity threshold. Such an approach provides for many advantages. For example, in Real Time Bidding (RTB), most often an impression is rendered inside a cross-domain iFrame to prevent advertiser from accessing any confidential information from the publisher web page. This provides additional security for the publishers since browser does not allow code such as JavaScript inside the iFrame to access the parent web page, but it also opens a loophole for the fraudsters to manipulate the CSS styles of the ad container, advertisement viewing area or other content viewing area to make the advertisement appear invisible to the user. Approaches described herein can generate a snapshot of the ad slot taking into account all styles that have been applied to the container. Approaches do not need access to the parent container and thus will work across all browsers and devices even when the ad slot is placed inside multiple levels of cross-domain iFrames.

Figure 5:
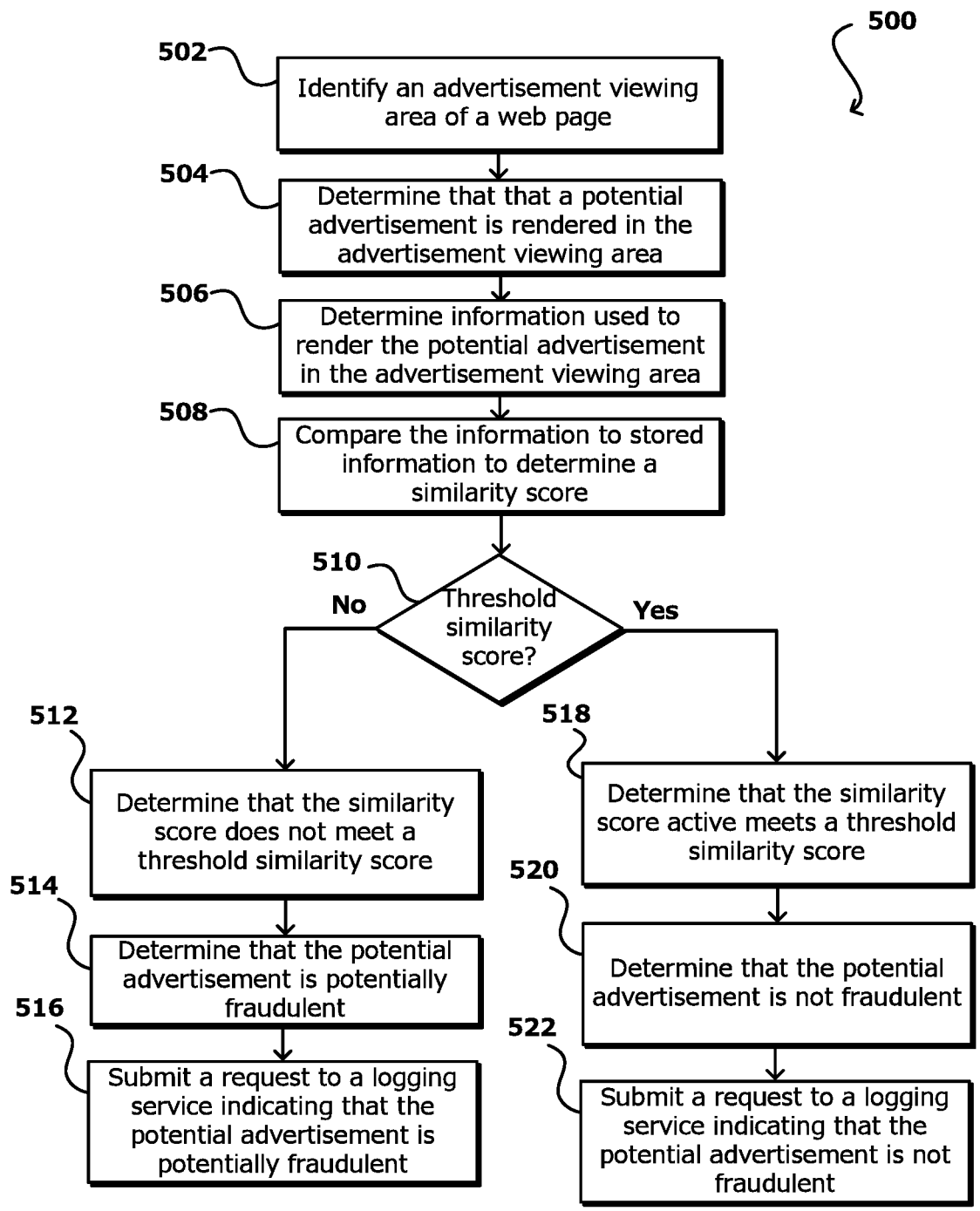
FIG. 5 illustrates an example process for determining viewability of content in accordance with various embodiments.

FIG. 5 illustrates an example process 500 for determining viewability of content in accordance with various alternate embodiments. In this example, a component operating on a computing device, a script executing on web browser, or other software code or application, can be used to determine whether content (e.g., an advertisement) is viewable. For example, an advertisement viewing area of a web page can be identified 502. The advertisement viewing area can be used to display a potential advertisement on the web page of a web browser. Determine 504 that the potential advertisement is rendered in the advertisement viewing area. Information used to render the potential advertisement in the advertisement viewing area can be determined 506. This can include determining that the potential content is rendered in the content viewing area, identifying a document object model corresponding to the content viewing area, the document object model including nodes organized in a tree structure, traversing the nodes of the document object model to determine information on applied cascading style sheets styles associated with the nodes, determining a position for each node in the document object model, and generating a layout tree based at least in part on the position of each node. Determining information on applied cascading style sheets styles associated with the nodes can include identifying a parent node to the nodes corresponding to the content viewing area and identify cascading style sheets styles applied to the parent node, wherein the applied cascading style sheets styles associated with the nodes is inherited from the identified cascading style sheets styles applied to the parent node. The layout tree can be used to generate an image representative of the potential content and in various embodiments the layout tree can be used to determine whether the potential content is fraudulent. For example, the image and the stored image can be compared to determine the similarity score. Factors considered in the comparison can include at least one of a size, opacity, a change of color, or a change of orientation of the image and stored image. The information can be compared 508 to stored information to determine a similarity score between the potential advertisement and a verified image of the advertisement. The similarity score can be compared 510 to a threshold similarity score to determine whether the potential advertisement is potentially fraudulent, wherein a fraudulent advertisement is an advertisement that is made to appear invisible on the web page and reported as viewable on the web page. In the situation where it is determined 512 that the similarity score does not meet a threshold similarity score, it can be determined 514 that the potential advertisement is potentially fraudulent and a request to a logging service indicating that the potential advertisement is potentially fraudulent can be submitted 516. Thereafter, a number of instances of potentially fraudulent advertisement can be determined and compared to a threshold. In the situation where the number of instances meets a threshold, the display of the advertisement can be considered fraudulent. In the situation where it is determined 518 that the similarity score meets a threshold similarity score, it can be determined 520 that the potential advertisement is not fraudulent and a request to a logging service indicating that the potential advertisement is not fraudulent can be submitted 522.

Figure 6:
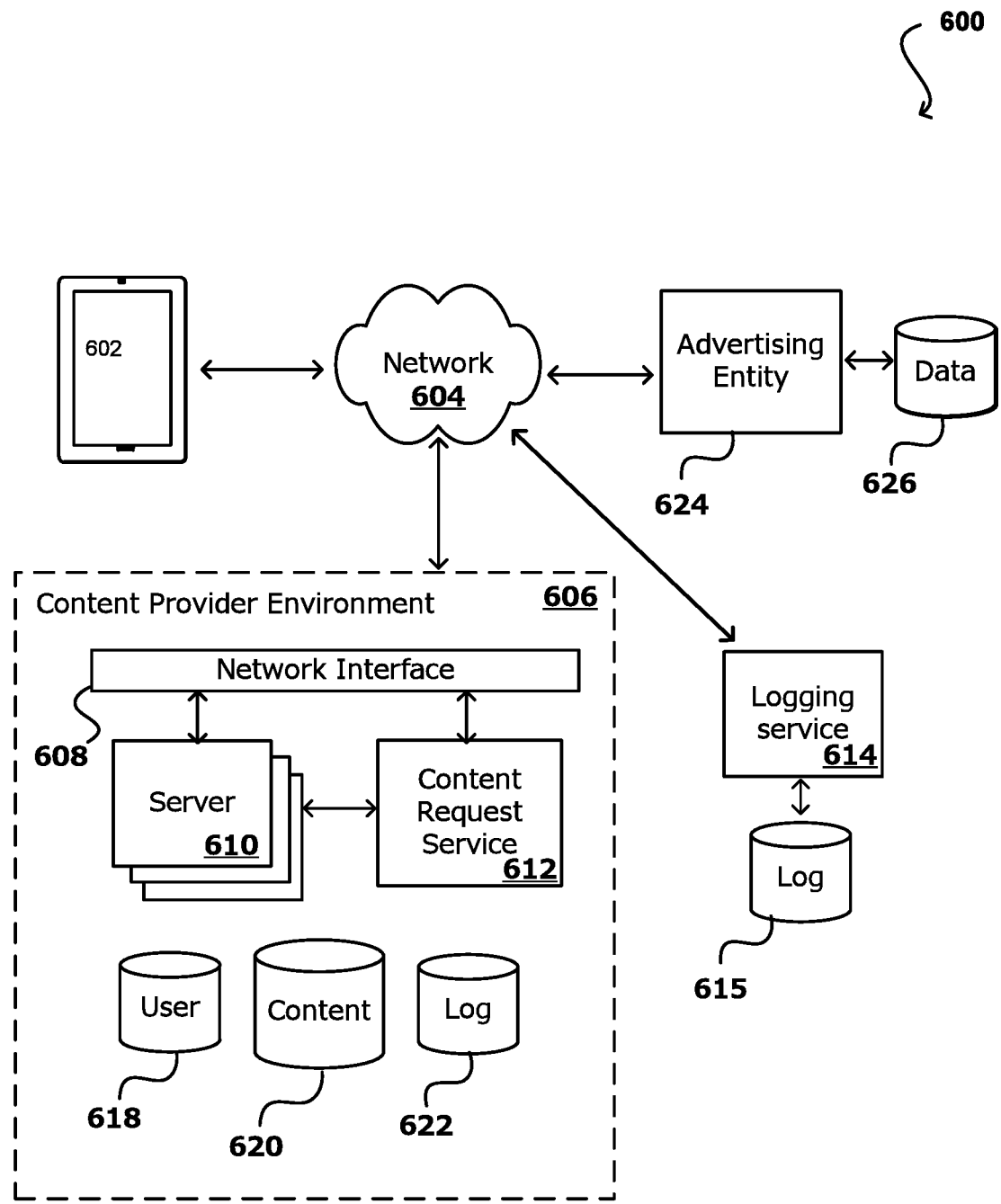
FIG. 6 illustrates an example environment in which aspects of the various embodiments can be implemented.

FIG. 6 illustrates an example environment 600 in which various embodiments can be implemented. In this example, a user is able to use a computing device 602 to submit a request for content, such as a Web page or electronic book, across at least one network 604. Although a portable computing device (e.g., an electronic book reader, smart phone, or tablet computer) is shown as the client device, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, and portable media players, among others. The at least one network 604 can include any appropriate network, such as may include the Internet, an Intranet, a local area network (LAN), a cellular network, and the like. The request can be sent to an appropriate content provider environment 606, which can provide one or more services, systems, or applications for processing such requests.

In this example, the request is received to a network interface layer 608 of the content provider environment 606. The network interface layer can include any appropriate components known or used to receive requests from across a network, such as may include one or more application programming interfaces (APIs) or other such interfaces for receiving such requests. The network interface layer 608 might be owned and operated by the provider, or leveraged by the provider as part of a shared resource or "cloud" offering. The network interface layer can receive and analyze the request from the client device 602, and cause at least a portion of the information in the request to be directed to an appropriate system or service, such as a server 610 (e.g., a Web server or application server), among other such options. In the case of Web pages, for example, at least one server 610 might be used to generate code and send content for rendering the requested Web page. In cases where processing is to be performed, such as to generate search results, perform an operation on a user input, verify information for the request, etc., information might also be directed to at least other server 610 for processing. The servers or other components of the environment might access one or more data stores, such as a data store 618 that contains information about the various users, and one or more content repositories 620 storing content able to be served to those users.

Once the appropriate components of the content provider environment 606 have determined the appropriate information, a response can be returned to the client device 602 over the network. This can include any relevant content, as well as code and/or script for rendering the content. As discussed, if an advertisement is to be included with the display of content, the code can also include code, links, or other information for obtaining the advertisement. This can include code for controlling display properties of the advertisement, as well as a call to one or more advertising entities 624 to obtain information for the advertisement, as may include text and/or image information stored in at least one data store 626. Where the advertisement is to be provided from an advertising entity, a browser application on computing device 602 in some embodiment can be used to submit a request to the advertising entity 624 across the network, which can return a response including the image, text, or other information for the advertisement(s) to be displayed. The request can include any appropriate information for selecting an advertisement to display as known in the art for such purposes. In some embodiments, the script on the page can cause a request to be submitted to an advertisement request service 612, or other such component, that can communicate with the advertising entity 624 and then package the active script with the advertising content for submission to the computing device 602. In other embodiments, the advertising and script will be determined by the advertisement request service 612 when the page is rendered, and the information will all be sent together to the computing device 602.

When the page of content and any advertisements are loaded, and when the active script on the page is executed, the active script executing on the client device 602 can analyze the properties of the page displayed to determine fraudulent activity as it relates to a publisher's reported web address and whether content has been viewed, or at least displayed with the opportunity of being viewed. For example, an advertisement viewing area of a web page can be identified. The advertisement viewing area can be used to display an advertisement on the web page of a web browser, where the web browser can include an address bar area indicating a uniform resource locator (URL) of the web page. The URL in the address bar can be updated to a publisher reported URL associated with the web page. A reload request of the web page can be detected and the publisher reported URL can be compared to an actual URL associated with a publisher of the web page. It can be determined there is a mismatch between the publisher reported URL and the actual URL associated with the publisher of the web page. In the situation where it is determined that the publisher reported URL does not match the actual URL associated with the publisher of the web page, then the publisher reported URL can be flagged as potentially fraudulent. In the situation where it is determined that the publisher reported URL matches the actual URL associated with the publisher of the web page, then it can be determined that the publisher reported URL is not fraudulent. In another example, information used to render a potential advertisement in the advertisement viewing area can be determined. The information can be compared to stored information to determine a similarity score between the potential advertisement and a verified image of the advertisement. The similarity score can be compared to a threshold similarity score to determine whether the potential advertisement is potentially fraudulent. In the situation where it is determined that the similarity score does not meet a threshold similarity score, it can be determined that the potential advertisement is potentially fraudulent. In the situation where it is determined that the similarity score meets a threshold similarity score, it can be determined that the potential advertisement is not fraudulent.

The script can then cause at least one call or request to be submitted to a least one logging service 614, within or outside the provider environment 606, where the call or request included information about the publisher's identify and visibility of the advertising and/or the presence of ad-blocking software, among other such options. The information can then be stored to a log database 615 or similar location for subsequent analysis. In some cases, the information in the log data store will periodically be pulled and transformed to a format that can be stored to a table in the user data store, or other data repository or data store 622, for reporting or statistical analysis with other data, enabling various types of reporting and analysis to be performed across various types of data. In various embodiments, the data store can be analyzed to determine a number of instances of the mismatch and the number of instances can be compared to a threshold. In the situation where the number of instances meets a threshold, the publisher's reported web address can be considered fraudulent and an appropriate action can be enabled. Such actions can include a review of the publisher, restricting the delivery of advertisements, among other such actions.

Figure 7:
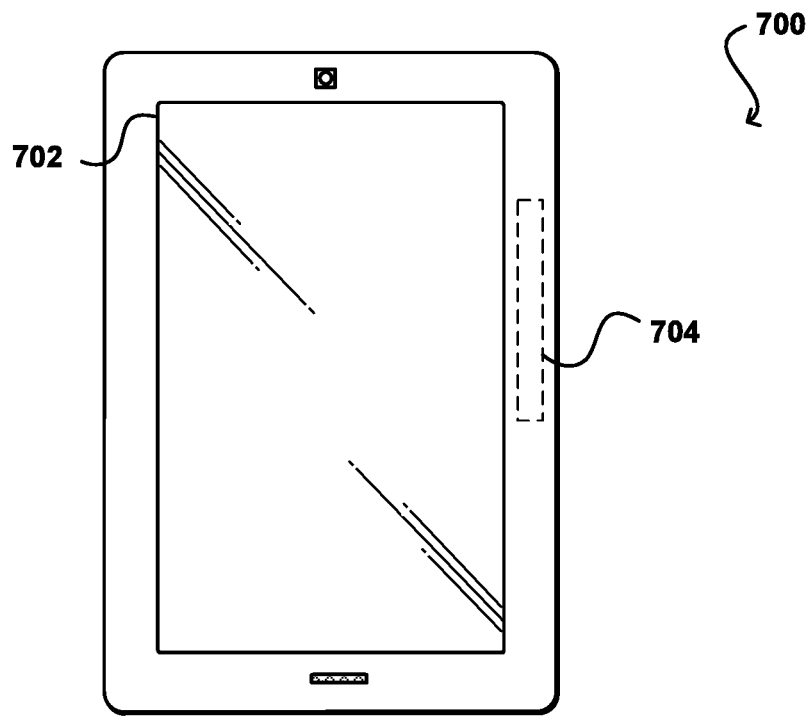
FIG. 7 illustrates an example computing device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 700 has a display screen 702 on the front side, which under normal operation will display information to a user facing the display screen (e.g., on the same side of the computing device as the display screen). It should be understood that computing devices such as servers, however, may not have dedicated display elements. The example computing device 700 also includes at least one networking component 704, such as a network interface card, wireless networking component, and the like, enabling the computing device to communicate information over at least one network.

Figure 8:
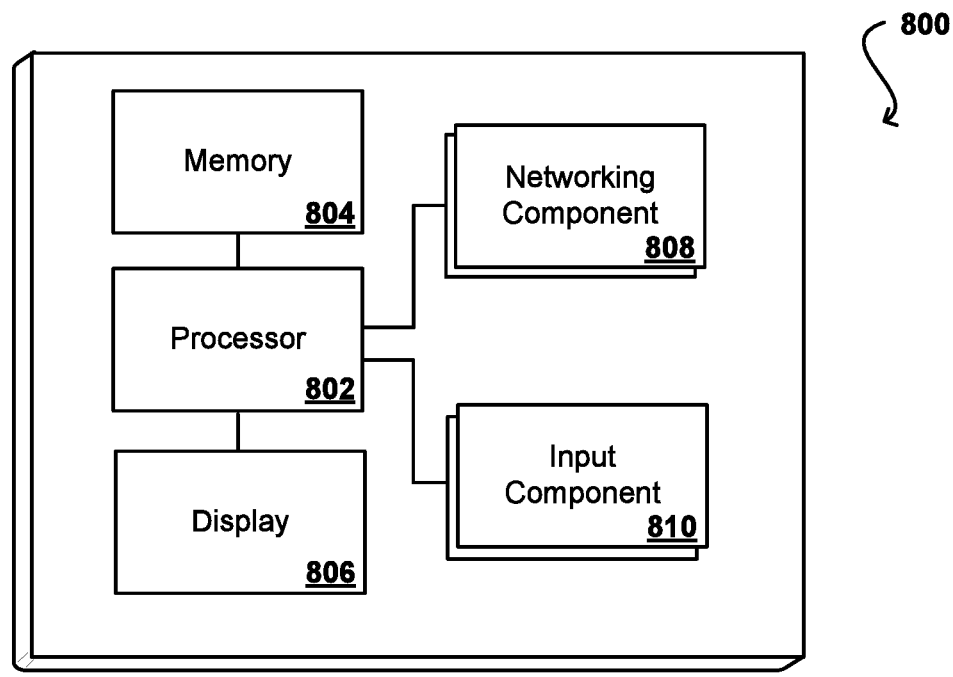
FIG. 8 illustrates example components of a computing device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. In some embodiments, the computing device 800 of FIG. 8 can include one or more networking and/or communication elements 808, such as a Wi-Fi, Bluetooth, RF, wired, or wireless communication system. The device in many embodiments can communicate with a network, such as the Internet, and may be able to communicate with other such devices. In some embodiments the device can include at least one additional input component 810 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

As discussed, different approaches can be implemented in various environments in accordance with the described embodiments. As will be appreciated, although a Web-based environment may be used for many examples herein for purposes of explanation, different environments may be used, as appropriate, to implement various embodiments. Such a system can include one or more electronic client devices, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof.

An illustrative environment can include at least one application server and data store. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of any system herein should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising: a display screen; at least one processor; and a memory device including instructions that, when executed by the at least one processor, cause the computing system to: receive a request for an advertisement, the request including a publisher reported uniform resource locator (URL) associated with a web page; and provide the advertisement and a script, the script being configured to: determine that the advertisement has been rendered in an advertisement viewing area of the web page, the advertisement viewing area used to display the advertisement on the web page of a web browser, the web browser including an address bar area indicating a uniform resource locator (URL) of the web page; update the URL in the address bar area to the publisher reported URL associated with the web page; detect a reload request of the web page; compare the publisher reported URL to an actual URL associated with a publisher of the web page; and determine whether the publisher reported URL is potentially fraudulent, wherein a potentially fraudulent URL occurs when there is a mismatch between the publisher reported URL and the actual URL associated with the publisher of the web page, the actual URL being determined based on an ad exchange associated with the advertisement.

2. The computing system of claim 1, wherein the instructions when executed to determine whether the publisher reported URL is potentially fraudulent further enable the script to: determine that the publisher reported URL does not match the actual URL associated with the publisher of the web page; determine that the publisher reported URL is potentially fraudulent; and submit a request to a logging service indicating that the publisher reported URL is potentially fraudulent.

3. The computing system of claim 1, wherein the instructions when executed to determine whether the publisher reported URL is potentially fraudulent further enable the script to: determine that the publisher reported URL matches the actual URL associated with the publisher of the web page; determine that the publisher reported URL is not fraudulent; and submit a request to a logging service indicating that the publisher reported URL is not fraudulent.

4. A computing device, comprising: a display screen; at least one processor; and a memory device including instructions that, when executed by the at least one processor, cause the computing device to: send a request for content, the request including a publisher reported uniform resource locator (URL) associated with a web page; and receive the content and a script, the script being configured to: determine that the content has been rendered a content viewing area of a web page, the content viewing area used to display content on the web page of a web browser, the web browser including an address bar area indicating a resource locator to a web resource; update the resource locator in the address bar area to a reported resource locator associated with the web page; compare the reported resource locator to an actual resource locator associated with a publisher of the web page; and determine whether the reported resource locator is potentially fraudulent, wherein a potentially fraudulent resource locator occurs when there is a mismatch between the reported resource locator and the actual resource locator associated with the publisher of the web page, the actual resource locator being determined based on an ad exchange associated with the content.

5. The computing device of claim 4, wherein the instructions when executed to determine whether the reported resource locator is potentially fraudulent further enable the script to: determine that the reported resource locator does not match the actual resource locator associated with the publisher of the web page; determine that the reported resource locator is potentially fraudulent; and submit a request to a logging service indicating that the reported resource locator is potentially fraudulent.

6. The computing device of claim 4, wherein the instructions when executed to determine whether the reported resource locator is potentially fraudulent further enable the script to: determine that the reported resource locator matches the actual resource locator associated with the publisher of the web page; determine that the reported resource locator is not fraudulent; and submit a request to a logging service indicating that the reported resource locator is not fraudulent.

7. The computing device of claim 4, wherein the content includes an advertisement, and wherein a publisher of the web page is integrated with one of an ad network or an ad exchange to monetize the content viewing area.

8. The computing device of claim 4, wherein the content viewing area is included in an iFrame.

9. The computing device of claim 4, wherein a publisher of the web page is associated with one of obscene or pirated content.

10. The computing device of claim 4, wherein the instructions when executed to update the resource locator in the address bar area enable the script to detect a reload request of the web page.

11. The computing device of claim 10, wherein the instructions when executed further enable the script to: cancel the reload request by redirecting the web browser to a redirection web page that includes no content; and flushing redirection web page resource locator cache.

12. The computing device of claim 4, wherein in response to a bid request from a publisher of the web page, a content exchange entity verifies the publisher's traffic quality and brand safety based at least in part on the reported resource locator.

13. The computing device of claim 4, wherein the instructions when executed further enable the script to: determine a number instances indicating that the reported resource locator is potentially fraudulent; compare the number of instances to a threshold; and flag the publisher as fraudulent in response to determine that the number of instances at least meets the threshold.

14. The computing device of claim 4, wherein the instructions when executed further enable the script to: determine information used to render potential content in the content viewing area; compare the information to stored information to determine a similarity score between the potential content and a verified image of the content; determine that the similarity score does not meet a threshold similarity score; and determine that the potential content is fraudulently being displayed.

15. A computer-implemented method, comprising:
sending a request for an advertisement, the request including a publisher reported uniform resource locator (URL) associated with a web page; and
receiving an advertisement and a script, the script configured to perform the steps of:
determining that the advertisement has been rendered in a content viewing area of a web page, the content viewing area used to display content on the web page of a web browser, the web browser including an address bar area indicating a resource locator to a web resource;
updating the resource locator in the address bar area to a reported resource locator associated with the web page;
comparing the reported resource locator to an actual resource locator associated with a publisher of the web page; and
determining whether the reported resource locator is potentially fraudulent, wherein a potentially fraudulent resource locator occurs when there is a mismatch between the reported resource locator and the actual resource locator associated with the publisher of the web page, the actual resource locator being determined based on an ad exchange associated with the content.

16. The method of claim 15, wherein determining whether the reported resource locator is potentially fraudulent further includes:
determining that the reported resource locator does not match the actual resource locator associated with the publisher of the web page;
determining that the reported resource locator is potentially fraudulent; and
submitting a request to a logging service indicating that the reported resource locator is fraudulent.

17. The method of claim 15, wherein determining whether the reported resource locator is potentially fraudulent further includes:
determining that the reported resource locator matches the actual resource locator associated with the publisher of the web page;
determining that the reported resource locator is not fraudulent; and
submitting a request to a logging service indicating that the reported resource locator is not fraudulent.

18. The method of claim 15, wherein the script is further configured to perform the steps of:
detecting a reload request of the web page;
canceling the reload request by redirecting the web browser to a redirection web page that includes no content; and
flushing redirection web page resource locator cache.

19. The method of claim 15, wherein a publisher of the web page is associated with one of obscene or pirated content, and wherein a publisher of the web page is integrated with one of an ad network or an ad exchange to monetize the content viewing area.

* * * * *